US008954109B2

(12) United States Patent  
Aboul-Magd et al.

(10) Patent No.: US 8,954,109 B2  
(45) Date of Patent: *Feb. 10, 2015

(54) ACCESS CATEGORY ENFORCEMENT IN WIRELESS LOCAL AREA NETWORKS

(71) Applicant: Apple Inc., Cupertino, CA (US)

(72) Inventors: Osama Aboul-Magd, Kanata (CA); Hesham Elbakoury, San Jose, CA (US); Sameh Rabie, Kanata (CA)

(73) Assignee: Apple Inc., Cupertino, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 13/646,078

(22) Filed: Oct. 5, 2012

(65) Prior Publication Data

US 2013/0033983 A1    Feb. 7, 2013

Related U.S. Application Data

(63) Continuation of application No. 13/405,686, filed on Feb. 27, 2012, now Pat. No. 8,311,024, which is a continuation of application No. 11/482,215, filed on Jul. 7, 2006, now Pat. No. 8,139,552.

(51) Int. Cl.  
*H04B 7/00* (2006.01)  
*H04L 29/06* (2006.01)  
(Continued)

(52) U.S. Cl.  
CPC ......... *H04L 65/1069* (2013.01); *H04W 74/002* (2013.01); *H04L 65/80* (2013.01); *H04W 84/12* (2013.01)  
USPC .................... 455/527; 455/67.13; 455/452.2; 370/338; 370/230

(58) Field of Classification Search  
USPC .............. 455/556.2, 439, 507, 561, 436, 527, 455/67.13, 452.2; 370/461, 468, 412, 338, 370/474, 476, 230, 229, 235; 709/229; 711/151  
See application file for complete search history.

(56) References Cited

U.S. PATENT DOCUMENTS 4,771,422 A * 9/1988 Hauer ............................ 370/359  
5,734,654 A * 3/1998 Shirai et al. ................... 370/396  
(Continued)

FOREIGN PATENT DOCUMENTS

WO     2005083909     9/2005

OTHER PUBLICATIONS

Notice of Allowance for U.S. Appl. No. 11/482,215 mailed Nov. 8, 2011, 9 pages.

(Continued)

*Primary Examiner* — Mahendra Patel  
(74) *Attorney, Agent, or Firm* — Meyertons, Hood, Kivlin, Kowert & Goetzel, P.C.

(57) ABSTRACT

The present invention provides a control function in an access point, switch, or like node on a wireless local area network. The control function operates to ensure frames transmitted by a user terminal are transmitted using an appropriate transmission priority scheme. The control function will assist and provide an appropriate priority level to the user terminal. Frames transmitted from the user terminal are passed through the control function, which will analyze priority level information provided in the frames to determine if the frames were transmitted using the appropriate transmission priority scheme. An enforcement action may be taken in response to identifying frames that were not transmitted using the appropriate transmission priority scheme.

27 Claims, 6 Drawing Sheets

(51) Int. Cl.
*H04W 74/00* (2009.01)
*H04W 84/12* (2009.01)

(56) References Cited

U.S. PATENT DOCUMENTS

| | | | |
|---|---|---|---|
| 6,122,267 A * | 9/2000 | Abiven et al. | 370/338 |
| 6,377,561 B1 | 4/2002 | Black et al. | |
| 6,665,534 B1 | 12/2003 | Conklin et al. | |
| 6,920,171 B2 | 7/2005 | Souissi et al. | |
| 6,975,639 B1 | 12/2005 | Hill et al. | |
| 7,027,465 B2 | 4/2006 | Hautala | |
| 7,061,902 B1 | 6/2006 | Fukuyama et al. | |
| 7,257,120 B2 | 8/2007 | Saunders et al. | |
| 7,333,439 B2 | 2/2008 | Itoh et al. | |
| 7,369,856 B2 | 5/2008 | Ovadia | |
| 7,447,180 B2 | 11/2008 | Jeong et al. | |
| 7,457,632 B2 | 11/2008 | Takagi et al. | |
| 7,471,629 B2 | 12/2008 | Melpignano | |
| 7,496,679 B2 | 2/2009 | Arita et al. | |
| 7,599,350 B2 | 10/2009 | Hollatz | |
| 7,616,642 B2 | 11/2009 | Anke et al. | |
| 7,657,672 B2 | 2/2010 | Kampmann et al. | |
| 7,756,103 B2 | 7/2010 | Alon et al. | |
| 8,139,552 B1 | 3/2012 | Aboul-Magd et al. | |
| 2002/0191594 A1 * | 12/2002 | Itoh et al. | 370/352 |
| 2003/0007508 A1 | 1/2003 | Sala et al. | |
| 2003/0123393 A1 * | 7/2003 | Feuerstraeter et al. | 370/235 |
| 2004/0013134 A1 * | 1/2004 | Hautala | 370/476 |
| 2005/0215284 A1 * | 9/2005 | Su et al. | 455/556.2 |
| 2006/0050661 A1 | 3/2006 | Shim et al. | |
| 2007/0153802 A1 * | 7/2007 | Anke et al. | 370/395.42 |
| 2007/0237104 A1 * | 10/2007 | Alon et al. | 370/311 |
| 2008/0256272 A1 * | 10/2008 | Kampmann et al. | 710/57 |

OTHER PUBLICATIONS

Non-final Office Action for U.S. Appl. No. 11/482,215 mailed Jul. 6, 2011, 15 pages.
Final Office Action for U.S. Appl. No. 11/482,215 mailed Apr. 11, 2011, 16 pages.
Non-final Office Action for U.S. Appl. No. 11/482,215 mailed Oct. 6, 2010, 14 pages.
Notice of Panel Decision from Pre-Appeal Brief Review for U.S. Appl. No. 11/482,215 mailed Jun. 30, 2010, 2 pages.
Advisory Action for U.S. Appl. No. 11/482,215 mailed Apr. 2, 2010, 4 pages.
Final Office Action for U.S. Appl. No. 11/482,215 mailed Dec. 23, 2009, 23 pages.
Non-final Office Action for U.S. Appl. No. 11/482,215 mailed Jun. 24, 2009, 20 pages.

* cited by examiner

| PRIORITY MAPPING ||
| --- | --- |
| PRIORITY LEVEL | ACCESS CATEGORY |
| 001 | BACKGROUND |
| 010 | BACKGROUND |
| 000 | BEST EFFORT |
| 011 | BEST EFFORT |
| 100 | VIDEO |
| 101 | VIDEO |
| 110 | VOICE |
| 111 | VOICE |

*FIG. 2*

ACCESS CATEGORY ENFORCEMENT IN WIRELESS LOCAL AREA NETWORKS

This application is a continuation of U.S. patent application Ser. No. 13/405,686, filed on Feb. 27, 2012, which is a continuation of U.S. patent application Ser. No. 11/482,215, now issued as U.S. Pat. No. 8,139,552, entitled "ACCESS CATEGORY ENFORCEMENT IN WIRELESS LOCAL AREA NETWORKS", filed Jul. 7, 2006, both of which are incorporated by reference as if fully and completely set forth herein.

FIELD OF THE INVENTION

The present invention relates to communications, and in particular to enforcing access categories in local wireless area networks.

BACKGROUND OF THE INVENTION

Given the ever-increasing desire for mobile communications and computing, wireless local area networks (WLANs) have emerged. WLANs now support high-speed wireless communication connections to a network for various types of user terminals, including personal computers, computer peripherals, telephones, personal digital assistants, and the like. Although WLAN technology has evolved to a point where there is sufficient bandwidth to support voice and other real time sessions, capacity is still finite. As the number of users wanting to communicate increases, quality of service (QoS) mechanisms are needed to maintain desired levels of quality.

Most WLAN deployments fall under the IEEE's 802.11 standards. Although the 802.11 products do not currently have a QoS mechanism, the IEEE has proposed a QoS extension to the basic wireless LAN standards. The QoS extension applies a hybrid coordination function (HCF) to assign communication priorities to user terminals that are contending for access to a common wireless channel. The QoS mechanism is referred to as enhanced distributed channel access (EDCA).

EDCA now has four access categories, corresponding to distinct priority levels for gaining access to a given wireless channel. The four access categories are voice, video, best effort, and background. In operation, access categories are assigned to user terminals and applications that are contending for the wireless channel to transmit or receive frames of information. The access categories may be assigned by a switch or access point of the WLAN backbone network. Theoretically, the user terminals are supposed to contend for and gain access to the WLAN based on the assigned access categories. User terminals participating in a voice session are generally given greater and more frequent access to a given wireless channel than user terminals that are sending emails, which require a priority level corresponding to either a best effort or background access category.

Unfortunately, the user terminals may automatically ignore or be configured to ignore an assigned access category and use a higher priority access category than that assigned to the user terminal when contending for and gaining access to the wireless channel. The switch or access point assigning the access categories has no way of ensuring that the user terminals are abiding by the assigned access categories. When user terminals do not abide by the relative priory levels for the assigned access categories, QoS goals of the service providers and for each of the users are not met.

Accordingly, there is a need for a technique to ensure that user terminals are operating in a manner consistent with assigned access categories. There is a further need to ensure such operation in a manner consistent with existing standards.

SUMMARY OF THE INVENTION

The present invention provides a control function in an access point, switch, or like node on a wireless local area network. The control function operates to ensure frames transmitted by a user terminal are transmitted using an appropriate transmission priority scheme. The control function will assist and provide an appropriate priority level to the user terminal. Frames transmitted from the user terminal are passed through the control function, which will analyze priority level information provided in the frames to determine if the frames were transmitted using the appropriate transmission priority scheme. An enforcement action may be taken in response to identifying frames that were not transmitted using the appropriate transmission priority scheme.

Priority levels may be assigned to transmitting frames associated with different applications or types of applications on a given user terminal. The control function may monitor information in the frames to identify the application or type of application associated with the frame to assist in determining the appropriate priority level for the frame. The particular user terminal from which the frame was transmitted may be identified using source information in the frames. Different user terminals may have different priority levels assigned to them, even when they are sharing a given access channel of the WLAN. In one embodiment, the priority information in the frames is provided in a traffic identification sub-field within a quality of service field in the frame. Further, the different priority levels may be associated with different transmission priority schemes for various access categories, such as background, best effort, video, and voice related access categories.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 is a chart mapping priority levels with access categories according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique to ensure that user terminals and applications operating in a WLAN environment operate in a manner consistent with assigned access categories, which correspond to relative priority levels for communications. In operation, a node in a WLAN will provide priority information pertaining to priority levels for accessing a wireless channel to a user terminal. Frames transmitted by the user terminal will identify the priority level at which they were transmitted. Frames transmitted from the user terminals are directed through the node that assigned the priority level to the user terminal. The node will determine whether the frame was transmitted using the proper priority level assigned to the user terminal. If the frame is transmitted with the proper priority level, the frame is forwarded toward its destination. If the frame was not transmitted according to the proper priority level, the node may take various actions, including dropping the frame or providing a warning to the user terminal to transmit the frames according to the proper priority level.

Figure 1:
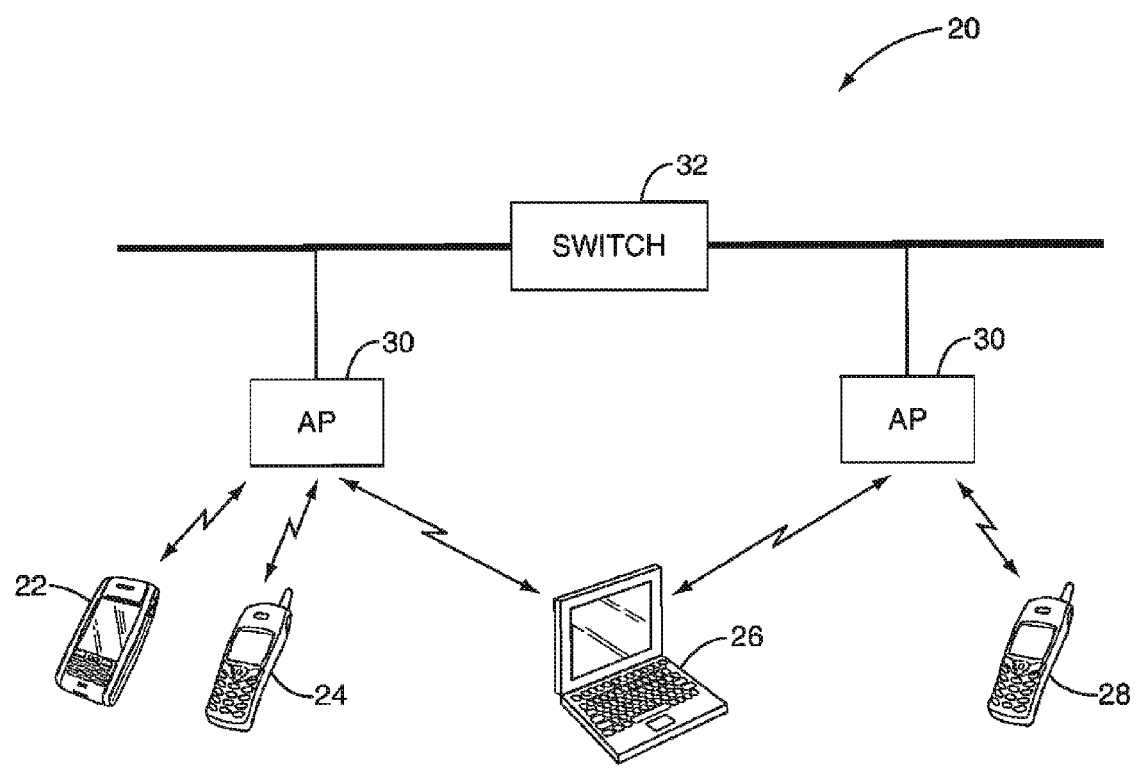
FIG. 1 is a block representation of a WLAN communication environment according to one embodiment of the present invention.

Prior to delving into the details of the present invention, an overview of a WLAN environment 20 is illustrated in FIG. 1. The WLAN environment 20 may support wireless communications with various user terminals, such as a personal digital assistant (PDA) 22, mobile terminal 24, personal computer (PC) 26, and mobile terminal 28. Although the user terminals may take any form, the following description will use the mobile terminal 24 as an exemplary embodiment. The mobile terminal 24 may support Bluetooth and cellular communications in addition to local wireless communications required for WLAN operation. In particular, an Ethernet-based switch 32 or the like is operatively coupled to one or more access points (APs) 30 to form a WLAN backbone network, wherein local wireless communications are facilitated between the access points 30 and any of the user terminals that are within a local wireless communication range.

Accordingly, frames intended for the mobile terminal 24 may be routed through the appropriate switch 32 to an access point 30 that is within a local wireless communication range of the mobile terminal 24. The access point 30 will then wirelessly transmit the frame to the mobile terminal 24 over an appropriate wireless access channel. The mobile terminal 24 may initiate delivery of information to a destination endpoint by gaining access to a wireless channel, and when the wireless channel is available, wirelessly transmit frames to an available access point 30. The access point 30 will forward the frame to the switch 32, which will further forward the frame toward an appropriate destination.

Since numerous mobile terminals 24 may contend for a given wireless channel, each mobile terminal 24 applies certain rules and timing to see if the wireless channel is available. In general, the various mobile terminals 24 that are contending for a given wireless access channel will check the availability of the wireless channel, and if available, transmit frames to the access point 30 for a certain period of time. The relative frequency at which the mobile terminals 24 check the availability of the wireless channel, and the amount of time during which a mobile terminal 24 may transmit frames upon determining that the wireless channel is available, may be proportional to the portion of the wireless channel that is used by the mobile terminal 24.

To control quality of service (QoS), the wireless channel must be shared among the various contending mobile terminals 24 in an appropriate manner. Distribution of a given wireless channel among multiple mobile terminals 24 may be based on priorities associated with the type of information being transmitted in the frames, a subscription level associated with the mobile terminal 24, or a combination thereof. As such, voice and streaming video sessions may be given priority over instant messaging, email, and file transfer applications. Further, mobile terminals 24 owned by subscribers who pay a greater subscription rate may be given a higher priority, and thus greater opportunity to access a given wireless access channel than mobile terminals 24 associated with a lower priority. Notably, multiple applications may run on a given mobile terminal 24, and communication sessions associated with these different applications may warrant different priority levels for the different session on a given mobile terminal 24.

Determination and allocation of priority levels among subscribers and applications is beyond the scope of the present invention. Those skilled in the art will recognize that priority levels among mobile terminals 24 in general and among different applications running on the same or different mobile terminal 24 may be assigned different priority levels. For the present invention, different priority levels may be assigned to different mobile terminals 24 as well as different communication sessions associated with different applications on a given mobile terminal 24. For a mobile terminal 24 or an application running thereon, priority levels associated with corresponding communication sessions are enforced in an efficient and effective manner.

Depending on configuration, different access categories or user priorities may be selected based on different assignment options. For example, priority levels may be assigned based on the address or identity of the mobile terminal, particular session, or application type. Those skilled in the art will recognize other options. For a session-based assignment, different users, perhaps identified by name, may be assigned to different priority levels. Further, groups of users may be assigned to a given priority level. For application-based assignment, an assignment such as that illustrated in FIG. 2 is applicable. For example, voice may be assigned to one priority level while file transfer applications may be assigned another priority level. Again, configuration and assignment of the access categories or priority levels may be configured in different ways to address a given scenario.

With reference to FIG. 2, a priority mapping schedule is provided for a WLAN communication environment 20 employing local wireless communications according to the IEEE 802.11 standards. In particular, four access categories are defined. These access categories correspond to communication sessions for voice applications, video applications, applications where best effort communications are sufficient, and applications where background communications are sufficient. Further assume that for each access category, two priority levels share the access category. Each of the eight priority levels is addressable using a three-bit word.

In operation, a control function is employed in the access points 30 or the switch 32, and will assign the priority level associated with an appropriate access category to the mobile terminal 24. The mobile terminal 24 will then transmit frames for a given communication session according to the assigned priority level. The priority level directly impacts the frequency at which the mobile terminal 24 will check to determine whether the wireless channel is available, and if the wireless channel is available, the time during which the mobile terminal 24 will maintain access of the wireless access channel for transmitting frames for the given communication session. Again, a given mobile terminal 24 may have different priority levels assigned to different communications sessions for different applications.

Figure 3:
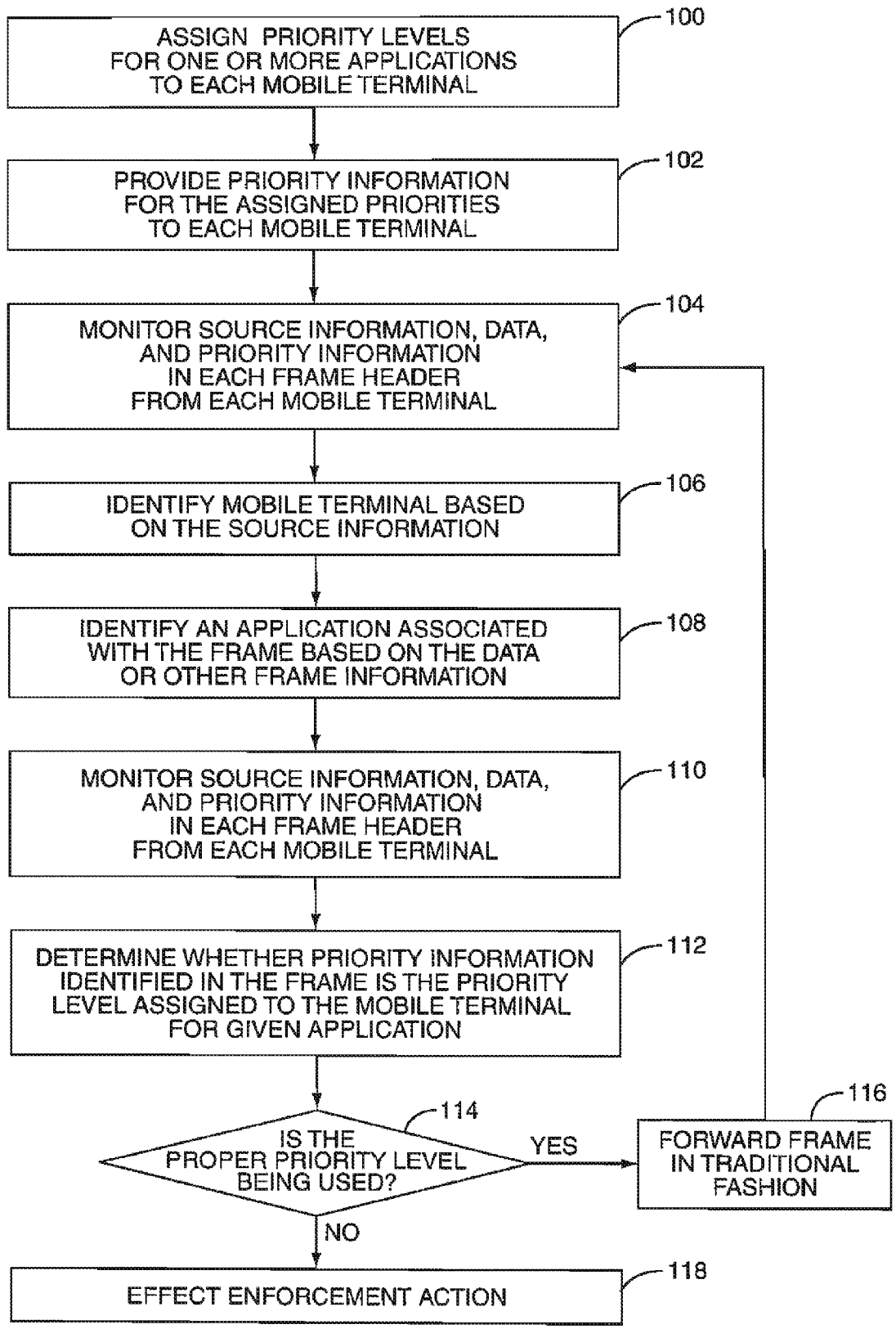
FIG. 3 is a flow diagram illustrating operation of the present invention according to one embodiment.

A flow diagram is provided in FIG. 3 to illustrate operation of the present invention according to one embodiment. Initially, the hybrid control function of either the access point 30 or the switch 32 will assign priority levels for one or more applications to each mobile terminal 24 contending for a given wireless access channel (step 100). The hybrid control function will then provide priority information corresponding to the assigned priority levels to each of the affected mobile terminals 24 (step 102).

At this point, the mobile terminals 24 have one or more priority levels controlling the mobile terminal's access to the given wireless channel. Different mobile terminals 24 may have different priority levels, and different applications may be assigned different priority levels on a given mobile terminal 24. Armed with the priority levels, the mobile terminals 24 will begin queuing frames to be transmitted. The mobile terminals 24 may have different queues for different communication sessions. When different applications or communication sessions are associated with different priority levels, there will generally be at least one queue for each priority level. Each frame is created to include priority information corresponding to the priority levels assigned for that particular type of communication session or for the mobile terminal 24 in general. All frames associated with a priority level will be transmitted from the mobile terminal 24 and received by the appropriate access point 30.

Regardless of whether the control function is implemented in the access point 30, the switch 32, or other entity, all frames associated with a priority level are routed through the control function, which will process the frames to ensure that the mobile terminal 24 from which the frames were transmitted is abiding by the channel access rules associated with the assigned priority level. The control function will monitor the source information, data, and priority information in the header of each frame from each mobile terminal 24 (step 104). The source information of the frame allows the control function to identify the mobile terminal 24 from which the frame was transmitted (step 106). If necessary, the data in the frame or other information gathered from the frame header may aid the control function in identifying the application associated with the frame (step 108). Identification of the application associated with the frame is useful when different applications are assigned different priority levels. Upon identifying the mobile terminal 24 from which the frame was transmitted and the application associated with the frame being transmitted, the control function can determine whether the priority information included in the frame corresponds to the priority level assigned to the mobile terminal 24 for the given application (step 110).

Next, the control function will determine if the proper priority level was used by the mobile terminal 24 when transmitting the frame based on the comparison of the priority information provided in the frame and the assigned priority level (step 112). If the proper priority level was used by the mobile terminal 24 (step 114), the frame is forwarded in traditional fashion (step 116), and the process repeats for each successive frame received from the mobile terminal 24. If the proper priority level was not used, the control function may take an appropriate enforcement action (step 118). The enforcement action may take various forms, such as simply dropping the frame, re-sending the assigned priority information to the offending mobile terminal 24, providing an appropriate warning to the offending mobile terminal 24, taking steps to end the communication session with which the frame is associated, or a combination thereof. Those skilled in the art will recognize other actions that may be taken when the hybrid control function discovers that a mobile terminal 24 is violating the assigned priority level.

Figure 4:
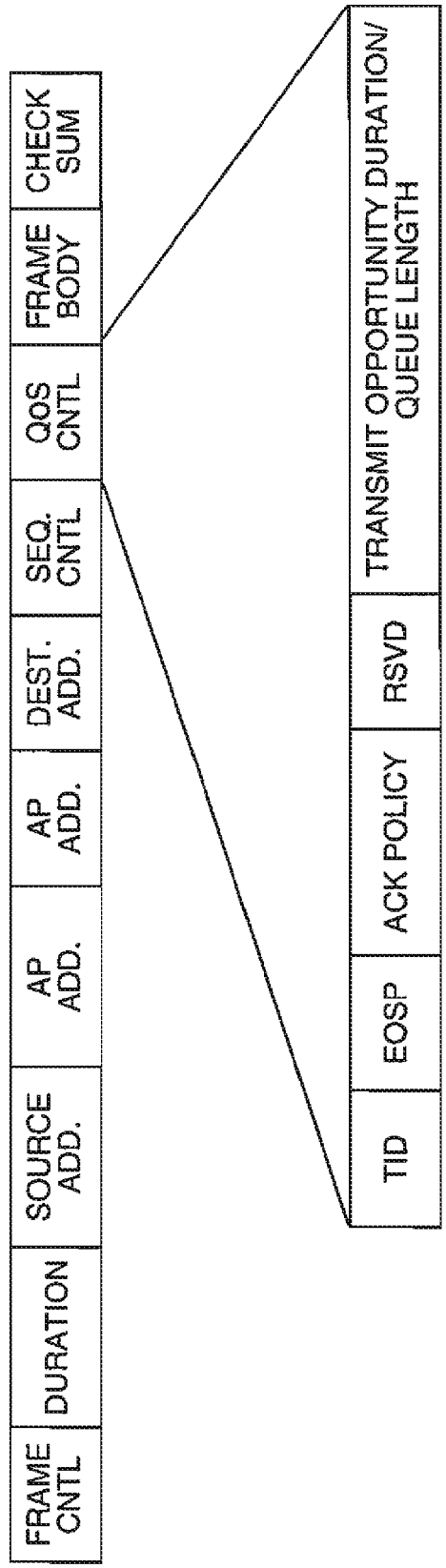
FIG. 4 represents an IEEE 802.11e frame according to one embodiment of the present invention.

With reference to FIG. 4, an exemplary IEEE 802.11e frame is illustrated according to one embodiment of the present invention. As illustrated, various fields of the frame are illustrated, and the QoS control field is expanded to illustrate one possible implementation of the present invention. The frame may include the following main fields: frame control, duration, source address, access point (AP) address (2), destination address, sequence control, QoS control, frame body, and checksum. The frame control field generally identifies the type of frame being transmitted, and in particular may identify management, data, or control frames. For the present invention, the affected frames will generally be data frames.

The duration field may specify a period in which the field must be delivered, wherein frames delivered after the period specified in the duration field are dropped. The source address identifies the address of the transmitting endpoint, in this example the address of the mobile terminal 24. The access point address fields may identify the addresses of participating access points 30 involved in the communication path. The destination address field identifies the destination address for the endpoint to which the frame is intended. The frame body field will include the data actually being delivered by the frame, and the checksum field will include some form of checksum to help determine whether or not there are errors in the transmitted frame.

Notably, the QoS control field may have various sub-fields, including a traffic identifier (TID) sub-field, an end of service (EOSP) sub-field, an acknowledgement (ACK) policy sub-field, a reserved (RSVD) sub-field, and a transmit opportunity duration/queue length subfield. The end of service sub-field is not used in this embodiment, and the acknowledgement policy sub-field defines how acknowledgements are handled in transmitting frames. For example, acknowledgment may be provided for each frame, for a group of frames, or not at all. The reserved sub-field is simply reserved for future use, and the transmit opportunity duration/queue length sub-field may have two or more purposes. Transmit opportunity duration may define an amount of time during which the mobile terminal 24 intends to maintain access of the wireless access channel, and queue length may provide an indication of how many frames are in the queue and ready to be transmitted at the mobile terminal 24. Armed with this information, the hybrid control function can dynamically assign priority levels based, at least in part, on the relative needs of the respective mobile terminals 24.

The TID sub-field may be used for implementation of the present invention. For example, the TID sub-field may be a four-bit field, wherein the first bit controls whether or not the frame is providing priority information corresponding to the priority level assigned to the mobile terminal 24 or an application provided by the mobile terminal 24. For example, if the first bit is a zero, the following three bits may provide priority information corresponding to the priority level used by the mobile terminal 24 to transmit the frame. These three bits may correspond to the priority levels of FIG. 2.

As those skilled in the art will recognize, the mobile terminal 24 must obtain or have knowledge of the available priority levels and be able to control access to a given local wireless channel based on defined rules corresponding to the various priority levels. Again, different priority levels may define different frequencies at which the given wireless access channel is checked for availability, the duration during which access to the given wireless access channel is maintained once access is obtained, or a combination thereof. Further, the mobile terminal 24 is able to provide the priority information in the TID sub-field or elsewhere in the frame, and function to transmit the frame over the given wireless channel according to the priority information provided in the frame.

If the TID includes the three-bit word corresponding to the priority level used to transmit the frame, the hybrid control function can readily identify the priority level used to transmit the frame as well as determine whether the priority level used to transmit the frame corresponds to the priority level that the mobile terminal 24 should have used when transmitting the frame.

Accordingly, the present invention allows different mobile terminals 24, as well as different applications within a given mobile terminal 24, to be assigned different priority levels associated with different QoS levels. By having the mobile terminal 24 include priority information in each frame corresponding to the priority level at which the mobile terminal 24 is actually transmitting the frame, the hybrid control function can monitor each frame to ensure that frames are being transmitted according to the appropriate priority levels. Since the hybrid control functions assign the appropriate priority levels to the mobile terminals 24, quality of service can be effectively controlled and maintained in an efficient and effective manner. Further, the hybrid control function can dynamically reassign priority levels to different mobile terminals 24 or to different applications in an effort to maintain appropriate QoS policies. The present invention may be employed for each available wireless access channel. Further, the priority levels may map to corresponding access categories defined in the IEEE 802.11 communication standards for WLAN communications.

Figure 5:
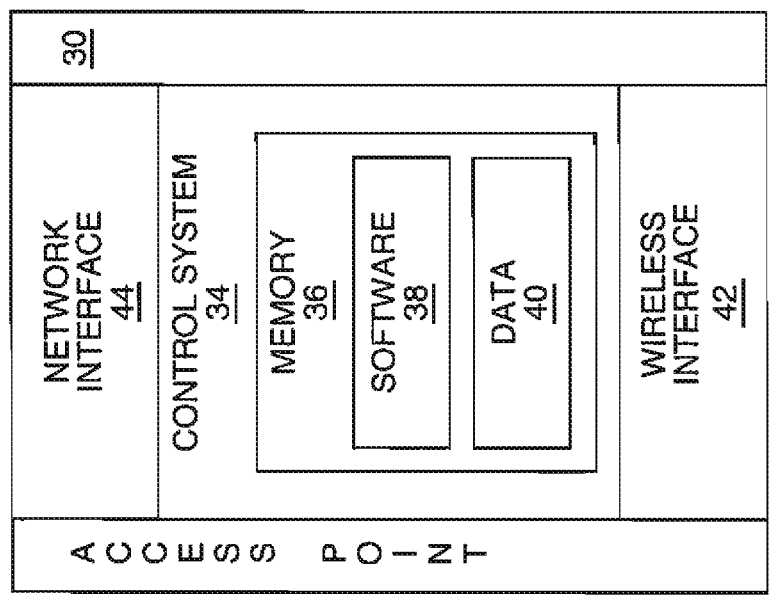
FIG. 5 is a block representation of an access point according to one embodiment of the present invention.

With reference to FIG. 5, a block representation of an access point 30 is illustrated. The access point 30 may include a control system 34 having sufficient memory 36 for the requisite software 38 and data 40 to operate as described above. The software 38 may include the hybrid control function for assigning and maintaining priority levels associated with the appropriate QoS policies. The control system 34 may be associated with a wireless interface 42 to facilitate local wireless communications with any number of user terminals, including the mobile terminal 24. The control system 34 may also be associated with a network interface 44 to facilitate communications with various entities, including the switch 32 via the WLAN backbone.

Figure 6:
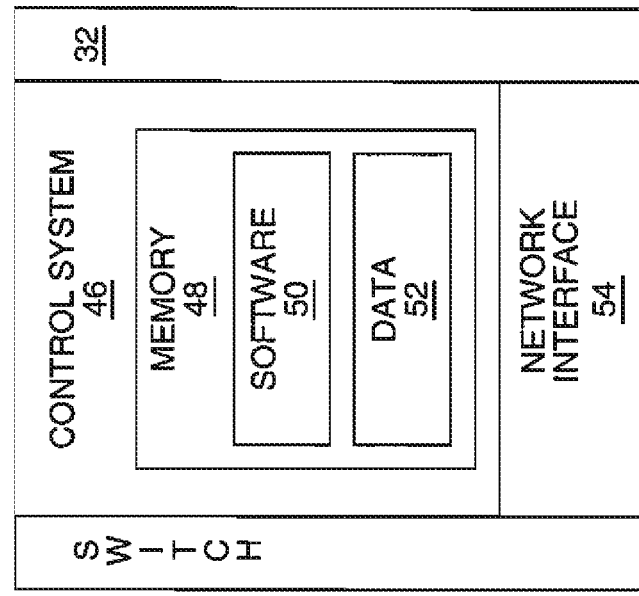
FIG. 6 is a block representation of a switch according to one embodiment of the present invention.

A block representation of a switch 32 is illustrated in FIG. 6. The switch 32 may include a control system 46 having sufficient memory 48 with the requisite software 50 and data 52 to operate as described above. Like the access point 30, the switch 32 may provide the control function in the software 50. The control system 46 will be associated with at least one network interface 54 to facilitate communications with various entities, such as the access points 30 of the WLAN backbone.

Figure 7:
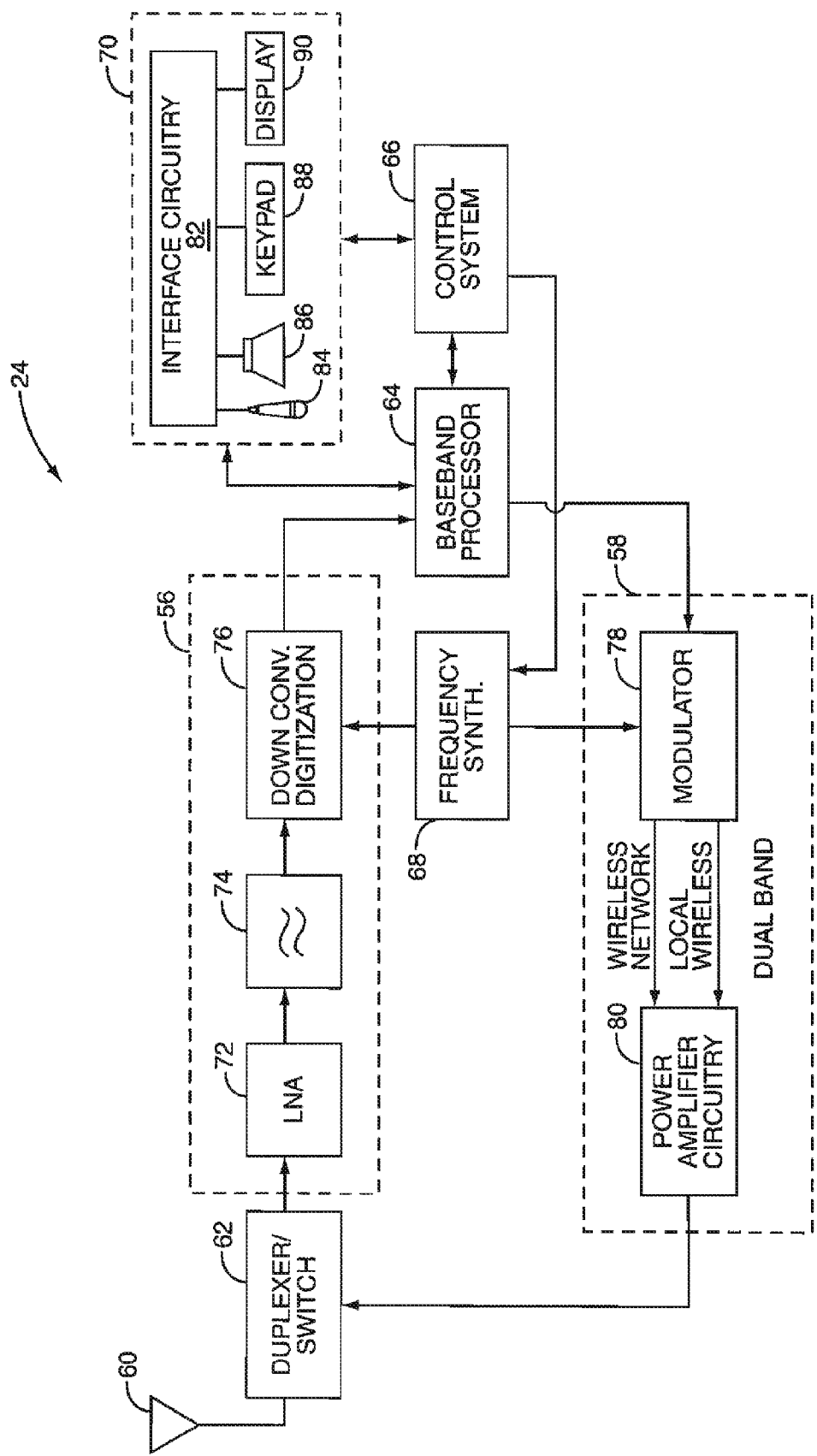
FIG. 7 is a block representation of a user terminal according to one embodiment of the present invention.

The basic architecture of the mobile terminal 24 is represented in FIG. 7 and may include a receiver front end 56, a radio frequency transmitter section 58, an antenna 60, a duplexer or switch 62, a baseband processor 64, a control system 66, a frequency synthesizer 68, and an interface 70. The receiver front end 56 receives information bearing radio frequency signals from one or more remote transmitters provided by a base station. A low noise amplifier 72 amplifies the signal. A filter circuit 74 minimizes broadband interference in the received signal, while downconversion and digitization circuitry 76 downconverts the filtered, received signal to an intermediate or baseband frequency signal, which is then digitized into one or more digital streams. The receiver front end 56 typically uses one or more mixing frequencies generated by the frequency synthesizer 68. The baseband processor 64 processes the digitized received signal to extract the information or data bits conveyed in the received signal. This processing typically comprises demodulation, decoding, and error correction operations. As such, the baseband processor 64 is generally implemented in one or more digital signal processors (DSPs).

On the transmit side, the baseband processor 64 receives digitized data, which may represent voice, data, or control information, from the control system 66, which it encodes for transmission. The encoded data is output to the transmitter 58, where it is used by a modulator 78 to modulate a carrier signal that is at a desired transmit frequency. Power amplifier circuitry 80 amplifies the modulated carrier signal to a level appropriate for transmission, and delivers the amplified and modulated carrier signal to the antenna 60 through the duplexer or switch 62.

A user may interact with the mobile terminal 24 via the interface 70, which may include interface circuitry 82 associated with a microphone 84, a speaker 86, a keypad 88, and a display 90. The interface circuitry 82 typically includes analog-to-digital converters, digital-to-analog converters, amplifiers, and the like. Additionally, it may include a voice encoder/decoder, in which case it may communicate directly with the baseband processor 64. The microphone 84 will typically convert audio input, such as the user's voice, into an electrical signal, which is then digitized and passed directly or indirectly to the baseband processor 64. Audio information encoded in the received signal is recovered by the baseband processor 64, and converted by the interface circuitry 82 into an analog signal suitable for driving the speaker 86. The keypad 88 and display 90 enable the user to interact with the mobile terminal 24, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   a first device assigning to a user terminal a first priority level of a plurality of priority levels for the user terminal to use when transmitting frames in a wireless network;
   the first device sending control information identifying the first priority level to the user terminal via the wireless network;
   the first device receiving a frame transmitted from the user terminal, wherein the frame comprises priority information identifying a priority level used by the user terminal when transmitting the frame; and
   the first device determining whether the frame was transmitted according to the first priority level based on said receiving the frame, wherein said determining whether the frame was transmitted according to the first priority level comprises comparing the priority level identified by the priority information to the first priority level.

2. The method of claim 1, further comprising:
the first device effecting an enforcement action when the frame was transmitted according to a priority level higher than the first priority level.

3. The method of claim 2, wherein effecting the enforcement action comprises one or more of:
providing a warning message to the user terminal;
resending the control information to the user terminal; or
ending a session associated with the frame.

4. The method of claim 1, wherein the priority information is provided in a quality of service field in the frame.

5. The method of claim 1, wherein the first priority level is assigned to the user terminal to use when transmitting frames for an application or a type of application and wherein said determining whether the frame was transmitted according to the first priority level comprises:
identifying the application or type of application for which the frame was transmitted based on information in the frame; and
determining whether the frame was transmitted according to the first priority level if the identified application or type of application corresponds to the application or type of application in said assigning.

6. The method of claim 5, wherein different priority levels are assigned to the user terminal for different ones of the applications or types of applications.

7. The method of claim 1, further comprising:
forwarding the frame toward a destination when the priority information in the frame corresponds to the first priority level.

8. The method of claim 1, wherein the plurality of priority levels comprise at least two of transmission priorities defined for background, best effort, video, or voice transmission schemes.

9. The method of claim 1, further comprising:
assigning priority levels to a plurality of user terminals that are sharing a given wireless access channel.

10. A non-transitory, computer accessible memory medium storing program instructions for performing communication in a wireless network, wherein the program instructions are executable by a processor of a first device associated with the wireless network to:
determine a first priority level of a plurality of priority levels for a user terminal to use when transmitting frames in a wireless network;
transmit control information identifying the first priority level to the user terminal via the wireless network;
receive a frame transmitted from the user terminal, wherein the frame comprises priority information identifying a priority level used by the user terminal when transmitting the frame; and
determine whether the frame was transmitted according to the first priority level based on said receiving the frame, wherein determining whether the frame was transmitted according to the first priority level comprises comparing the priority level identified by the priority information to the first priority level.

11. The non-transitory, computer accessible memory medium of claim 1, wherein the program instructions are further executable to:
effect an enforcement action when the frame was transmitted according to a priority level higher than the first priority level.

12. The non-transitory, computer accessible memory medium of claim 11, wherein effecting the enforcement action comprises one or more of:
providing a warning message to the user terminal;
resending the control information to the user terminal; or
ending a session associated with the frame.

13. The non-transitory, computer accessible memory medium of claim 10, wherein the first priority level is assigned to the user terminal to use when transmitting frames for an application or a type of application and wherein said determining whether the frame was transmitted according to the first priority level comprises:
identifying the application or type of application for which the frame was transmitted based on information in the frame; and
determining whether the frame was transmitted according to the first priority level if the identified application or type of application corresponds to the application or type of application in said assigning.

14. The non-transitory, computer accessible memory medium of claim 10, wherein the plurality of priority levels comprise at least two of transmission priorities defined for background, best effort, video, or voice transmission schemes.

15. A device, comprising:
network communication circuitry for performing communication in a wireless network; and
processing hardware coupled to the network communication circuitry, wherein the processing hardware is configured to:
determine a first priority level of a plurality of priority levels for a user terminal to use when transmitting frames in a wireless network;
transmit control information identifying the first priority level to the user terminal via network communication circuitry;
receive a frame transmitted from the user terminal via the network communication circuitry, wherein the frame comprises priority information identifying a priority level used by the user terminal when transmitting the frame; and
determine whether the frame was transmitted according to the first priority level based on said receiving the frame, wherein determining whether the frame was transmitted according to the first priority level comprises comparing the priority level identified by the priority information to the first priority level.

16. The device of claim 15, wherein the processing hardware is further configured to:
effect an enforcement action when the frame was transmitted according to a priority level higher than the first priority level.

17. The device of claim 16, wherein effecting the enforcement action comprises one or more of:
providing a warning message to the user terminal;
resending the control information to the user terminal; or
ending a session associated with the frame.

18. The device of claim 15, wherein the first priority level is assigned to the user terminal to use when transmitting frames for an application or a type of application and wherein said determining whether the frame was transmitted according to the first priority level comprises:
identifying the application or type of application for which the frame was transmitted based on information in the frame; and
determining whether the frame was transmitted according to the first priority level if the identified application or type of application corresponds to the application or type of application in said assigning.

19. The device of claim 15, wherein the plurality of priority levels comprise at least two of transmission priorities defined for background, best effort, video, or voice transmission schemes.

20. A user terminal, comprising:
wireless communication circuitry for performing wireless communication in a wireless network;
processing hardware coupled to the wireless communication circuitry, wherein the control logic is configured to assign priority of packets for transmission in the wireless network, wherein the control logic is configured to:
receive control information from a first device associated with the wireless network using the wireless communication circuitry, wherein the control information indicates a first priority level for the user terminal to use when transmitting packets on the wireless network;
transmit packets to the first device using the wireless communication circuitry, wherein the packets are transmitted at a second priority level that is different from the first priority level, wherein the packets comprises priority information identifying the second priority level;
determine an enforcement action taken due to the packets being transmitted at the second priority level instead of the first priority level.

21. The user terminal of claim 20, wherein said determining an enforcement action comprises receiving an indication of the enforcement action from the first device.

22. The user terminal of claim 20, wherein the enforcement action comprises dropping the packets.

23. The user terminal of claim 20, wherein said determining the enforcement action comprises receiving a warning message from the first device.

24. The user terminal of claim 20, wherein said determining the enforcement action comprises receiving the control information from the first device.

25. The user terminal of claim 20, wherein the enforcement action comprises ending a session associated with the packets.

26. The method of claim 1, wherein the wireless network is a wireless local area network (WLAN).

27. The method of claim 1, wherein the first priority level corresponds to a quality of service (QoS) for packets associated with the user terminal.

\* \* \* \* \*